United States Patent
Singh et al.

(10) Patent No.: US 12,307,611 B2
(45) Date of Patent: May 20, 2025

(54) CUSTOMIZED PASSTHROUGH

(71) Applicant: Adeia Guides Inc., San Jose, CA (US)

(72) Inventors: Gyanveer Singh, Bangalore (IN); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 213 days.

(21) Appl. No.: 18/088,325

(22) Filed: Dec. 23, 2022

(65) Prior Publication Data

US 2024/0212288 A1 Jun. 27, 2024

(51) Int. Cl.
| | | |
|---|---|---|
| *G06T 19/00* | (2011.01) | |
| *G06F 3/01* | (2006.01) | |
| *G06F 3/04815* | (2022.01) | |
| *G06F 3/04842* | (2022.01) | |
| *G06V 40/16* | (2022.01) | |
| *G06V 40/20* | (2022.01) | |

(52) U.S. Cl.
CPC ............ *G06T 19/006* (2013.01); *G06F 3/013* (2013.01); *G06F 3/04815* (2013.01); *G06F 3/04842* (2013.01); *G06V 40/176* (2022.01); *G06V 40/20* (2022.01)

(58) Field of Classification Search
CPC ... G06T 19/006; G06F 3/013; G06F 3/04815; G06F 3/04842; G06V 40/176; G06V 40/20

See application file for complete search history.

(56) References Cited

U.S. PATENT DOCUMENTS

| | | |
|---|---|---|
| 2017/0027650 A1* | 2/2017 | Merck ................ A61B 1/00011 |
| 2017/0301065 A1 | 10/2017 | Adsumilli et al. |
| 2021/0095989 A1* | 4/2021 | Matlack ............... G05D 1/0088 |
| 2022/0171187 A1* | 6/2022 | Bleyer .................. G06T 19/006 |
| 2024/0104693 A1* | 3/2024 | Palakkode ............... G06T 7/70 |

(Continued)

OTHER PUBLICATIONS

"What Is Project Cambria? A Bigger, Badder Oculus Variant in the Works," XR Today, https://www.xrtoday.com/virtual-reality/what-is-project-cambria-a-bigger-badder-oculus-variant-in-the-works/ (2021).

(Continued)

*Primary Examiner* — Grace Q Li
(74) *Attorney, Agent, or Firm* — Haley Guiliano LLP

(57) ABSTRACT

System and methods for customizing passthrough feed are disclosed. Expected VR content and predicted user movements in a real-world environment are determined based on recently rendered VR content, user activity data, and real-world scenes. When passthrough feed is enabled, it may be customized based on the expected VR content and predicted user movements. Customization techniques comprising custom style filters, style transfer neural networks, and adding VR content elements to the passthrough feed display window may be used to customize the passthrough feed to match the style of the VR content. The use of the customization techniques may be based on one of or a combination of a duration during which the passthrough feed is activated, the color intensity difference between the realities, an event or purpose which triggered activation of the passthrough feed, or a size of a display window of the passthrough feed relative to the VR content.

18 Claims, 5 Drawing Sheets

(56) References Cited

U.S. PATENT DOCUMENTS

2024/0203306 A1* 6/2024 Pieri .................. G06F 3/147

OTHER PUBLICATIONS

Desai, Bhishman, et al., "Image Filtering—Techniques, Algorithm and Applications," GIS Science Journal, vol. 7, Iss. 11 (2020).

Gatys, Leon A., et al., "Image Style Transfer Using Convolutional Neural Networks," CVPR 2016.

Ghiasi, Golnaz, "Exploring the structure of a real-time, arbitrary neural artistic stylization network," British Machine Vision Conference (2017).

Himite, Bilal, "Image Processing and Pixel Manipulation: Photo Filters," Medium, https://towardsdatascience.com/image-processing-and-pixel-manipulation-photo-filters-5d37a2f992fa (2021).

Huang, Xun, et al., Arbitrary Style Transfer in Real-time with Adaptive Instance Normalization, Department of Computer Science & Cornell Tech, Cornell University (2017).

Kang, Hongwen, et al., "Image Matching in Large Scale Indoor Environment," www.ri.cmu.edu (2009).

Lang, Ben, "Microsoft is Adding Pass-through Video to Windows VR Headsets," ROADTOVR, https://www.roadtovr.com/microsoft-is-adding-pass-through-video-to-windows-vr-headsets/ (2018).

McKelvey, Cynthia, "Why does virtual reality make you want to puke?," daily dot, https://www.dailydot.com/unclick/virtual-reality-sickness-science/ (2021).

Pisani, Mikaela, "How to Generate Images with AI," Rootstrap, https://www.rootstrap.com/blog/how-to-generate-images-with-ai (2022).

Sahu, Apratim, "Art with AI: Turning photographs into artwork with Neural Style Transfer," Medium, https://towardsdatascience.com/art-with-ai-turning-photographs-into-artwork-with-neural-style-transfer-8144ece44bed (2020).

Xu, Long, et al., "Visual Quality Assessment by Machine Learning," Springer Nature Link, https://link.springer.com/book/10.1007/978-981-287-468-9, 2015.

YouTube Video on NEW Quest 2 Passthrough VR Videos are the BEST I've ever seen, Apr. 1, 2022, https://www.youtube.com/watch?v=keufFXiO1_M&t=281s.

YouTube Video on Project Cambria Preview—Mixed Reality with Presence Platform, May 12, 2022, https://www.youtube.com/watch?v=tgJ7m0Phd64.

* cited by examiner

CUSTOMIZED PASSTHROUGH

BACKGROUND

The present disclosure relates to customization of passthrough feeds in a virtual reality (VR) environment. In particular, system and methods are described herein for dynamically customizing passthrough feeds based on real-time conditions of the VR environment.

SUMMARY

When passthrough functionality is enabled in a VR setting to capture images from the real-world environment, passthrough feed and VR content may be displayed simultaneously on the VR display. The contrasting styles between the passthrough feed and the VR content may be significant and jarring to a user. For example, VR content may be rendered in full color with animation and high luminescence, while the passthrough feed may be shown in black and white. The more a user is engaged in immersive content, the more striking the differences may be when passthrough is enabled. As passthrough may be enabled by certain events, passthrough may be triggered at unexpected times to the user, causing the user to experience sudden changes in the VR display. Moreover, the user may experience sensory contrast, such as eye discomfort, eye strain, headache, cognitive dissonance, sensory overload, and so forth, even with colorized passthrough feeds or static filters applied to the transitions between the displayed realities. Accordingly, there is a need for improved techniques for dynamically customizing passthrough feed to smoothen the transition between displays of passthrough images and VR content.

In accordance with some embodiments disclosed herein, some of the above-mentioned limitations are overcome by rendering, on a virtual reality (VR) device, VR content along with a customized passthrough feed. The rendering of the VR content along with the customized passthrough feed is performed by: receiving user activity data of a user associated with the VR device; predicting at least a next segment of VR content based on the rendered VR content and user activity data; predicting, based on the user activity data, user movement with respect to a real-world environment; activating a passthrough feed; based on the next segment of VR content and the predicted user movement in the real-world environment, customizing the passthrough feed; and displaying the customized passthrough feed simultaneously with the VR content on the VR device. Embodiments of the present disclosure may be suitable for extended reality, virtual reality, augmented reality, mixed reality, assisted reality, and other similar systems. According to some embodiments, the VR device may be an XR device, through which an XR environment (e.g., a virtual reality (VR), augmented reality (AR) or mixed reality (MR) environment) can be accessible to the user when operating the XR device.

According to some embodiments, limitations may be overcome by customizing the passthrough feed further comprises incorporating VR content features into the passthrough feed, and a degree of customizing the passthrough feed with VR content features corresponds to an estimated duration during which the passthrough feed is activated. Limitations may also be overcome by customizing the passthrough feed based on an event or purpose which triggered the activation of the passthrough feed. Limitations may further be overcome by customizing the passthrough feed based on a size of a display window of the passthrough feed relative to a size of a display window of the VR content.

Some embodiments of the present disclosure also comprise generating a custom style filter for customizing the passthrough feed, wherein the custom style filter is based on low-level features extracted from at least an image frame of the rendered VR content. The degree of blending by the custom style filter of the passthrough feed and the VR content may correspond to a level of color intensity difference between the passthrough feed and the VR content. In some embodiments, the custom style filter comprises a pixel-manipulation-based filter.

Some embodiments of the present disclosure also comprise creating a style transfer neural network for customizing the passthrough feed, wherein the style transfer neural network is based on low-level features extracted from at least an image frame of the rendered VR content. The degree of blending by the style transfer neural network of the passthrough feed and the VR content may correspond to a level of color intensity difference between the passthrough feed and the VR content. Creating the style transfer neural network may further comprise estimating a number of layers of the style transfer neural network, the number of layers based on at least one of: a duration for which the passthrough feed needs to be activated, a level of color intensity difference between the VR content and the passthrough feed, an event or purpose which triggered activation of the passthrough feed, or a size of a display window of the passthrough feed relative to a size of a display window of the VR content.

Some embodiments of the present disclosure also comprise selecting an object of interest from the VR content and overlaying the object of interest on a portion of the passthrough feed.

According to some embodiments, the user activity data may be detected by at least one of an inward facing camera, eye tracker, external camera, inertial measurement unit or a wearable device coupled to the VR device. According to some embodiments, the user activity data may comprise at least one of eye movement, facial expression, bodily movement, or biometric data.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
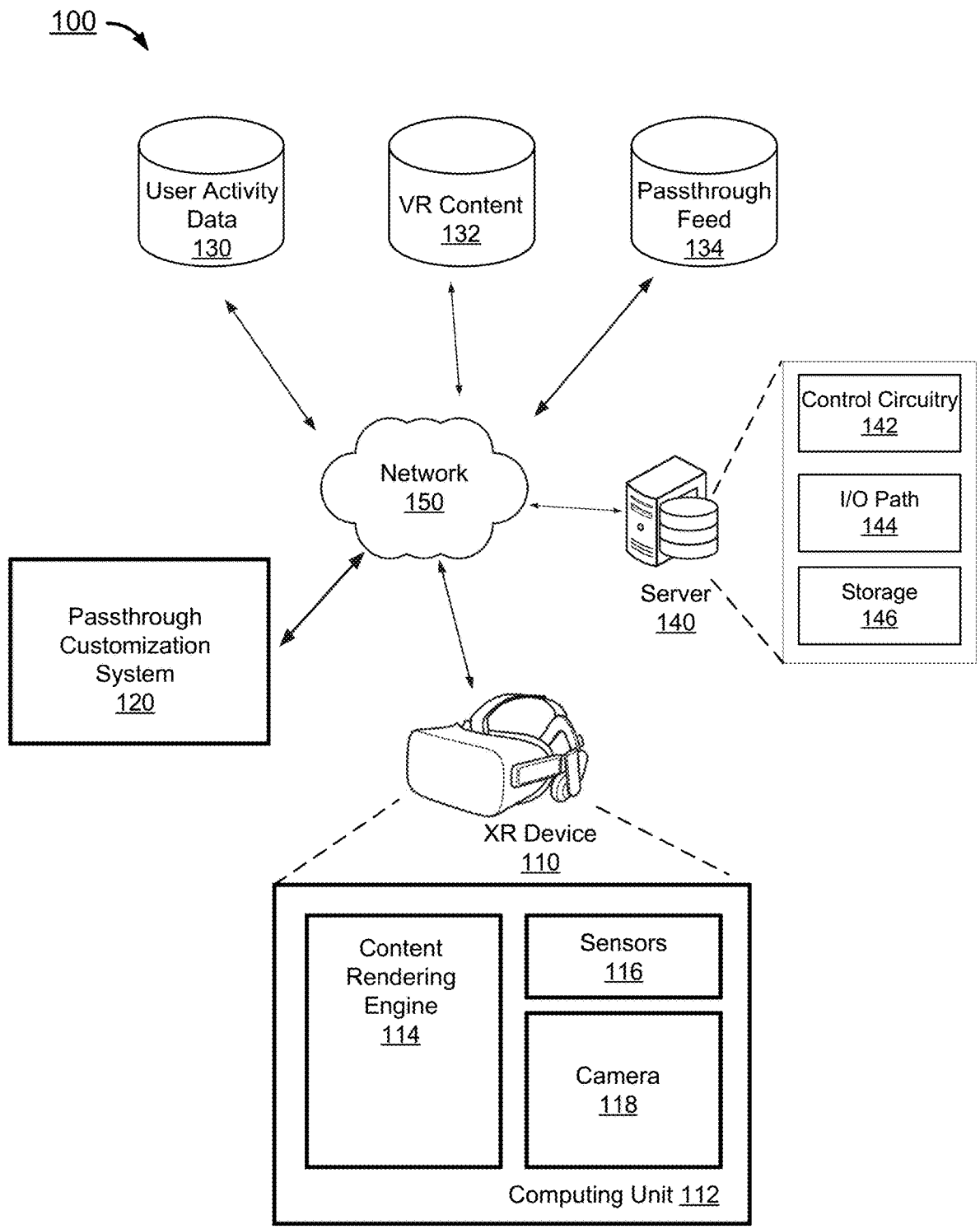
FIG. 1 shows an example environment for generating a customized passthrough feed during a VR (virtual reality) experience, in accordance with some embodiments of this disclosure.

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale FIG. 1 shows an example environment 100 for generating a customized passthrough feed during a VR (virtual reality) experience, in accordance with some embodiments of this disclosure. According to some embodiments, the environment 100 comprises XR device 110, passthrough customization system 120, user activity data store 130, VR content data store 132, passthrough feed data store 134, server 140, and communication network 150. Embodiments of the present disclosure may be suitable for extended reality, virtual reality, augmented reality, mixed reality, assisted reality, and other similar systems. For example, the XR environment may be a virtual reality (VR), augmented reality (AR) or mixed reality (MR) environment accessible to a user when operating XR device 110.

Communication network 150 may be any suitable type of network, including a LAN, WLAN, WAN, mobile network, or the Internet. XR device 110 may further comprise computing unit 112, content rendering engine 114, sensors 116, and camera 118. In an embodiment, XR device 110 provides VR content and captures user activity data and/or passthrough feed. Passthrough customization system 120 may extract data from the VR content, such as scene information, image features of elements, and so forth, which may be stored in VR content data store 132. Passthrough customization system 120 may also extract data from the passthrough feed, such as scene information, image features of real-world elements, and the like, which may be stored in passthrough feed data store 134. Passthrough customization system 120 may customize the passthrough feed based on the user activity data, VR content data, and/or passthrough feed data and transmit the customized passthrough feed over network 150 to XR device 110. In the example, the capture of passthrough feed, the collection of user activity data and VR content and passthrough data, and the customization of the passthrough feed is distributed over various components in environment 100. In other embodiments, the capture of the passthrough feed, collection of user activity data and VR content and passthrough data, and the customization of the passthrough feed may be performed on XR device 110. For example, passthrough customization system 120 and computing unit 112 may be located on XR device 110. In yet another embodiment, computing unit 120 and/or passthrough customization system 120 may be located on a mobile device or a server 140 responsible for rendering AR/VR content.

In an embodiment, XR device 110 comprises a VR device and renders VR content to a user during a VR session. XR device 110 may be configured to enable a passthrough mode (e.g., receive and display a passthrough feed), such as by way of camera 118, allowing the user to see their surroundings in the real-world environment through the VR content. In an example, upon enabling the passthrough feed, the VR content and passthrough feed may initially be displayed simultaneously (e.g., a passthrough feed window within the VR content display) and gradually transition to filling the entire field of view of the VR display with a rendering of only one of the realities. To reduce or prevent accidents and discomfort of the user due to abrupt changes when the passthrough feed is presented within the XR device 110, the passthrough feed may be customized dynamically to match the style of the VR content. The passthrough feed may be customized based on changes in at least the VR content data, real-world environment (passthrough feed data), or user activity data.

In an embodiment, computing unit 112 is operable to receive and analyze frames of VR content, frames of passthrough feed, and collect user activity data in relation to the VR environment and/or real-world environment. Computing unit 120 may include camera 118 or a plurality of cameras, such as outward-facing cameras (e.g., imaging sensors for capturing real-time frames and scene information of the user's real-world environment surrounding XR device 110), inward-facing cameras (e.g., for collecting data on the user's response to the VR and/or real-world environment in real-time, etc.), external cameras coupled to the computing unit, ultrasound sensors, imaging radars, and so forth. Computing unit 120 may be located on the XR device 110. In other embodiments, computing unit 120 may be on a mobile device or a server responsible for rendering AR/VR content. Computing unit 120 may also comprise onboard sensors 116 (or external sensors coupled to computing unit 120) for collecting and recording user activity data, such as inertial measurement units (e.g., accelerometer, gyroscopes, magnetometer, etc.), eye trackers, head trackers, and the like. Content rendering engine 114 is operable to render frames of VR content to a display on XR device 110, as well as render passthrough feed and customized passthrough (e.g., a customized mix of passthrough feed and VR content, a gradual transition from one reality to another, etc.).

Passthrough customization system 120 is operable to dynamically customize passthrough feed based on frames of recently rendered VR content, expected VR content, real-world conditions surrounding the user, and predicted user activity with respect to his real-world surroundings in some embodiments. Expected VR content may comprise at least a next segment of VR content that is to be rendered (after the recently rendered VR content). Expected VR content may be predicted based on scene information from recently rendered VR content and user activity data (e.g., user's movement with respect to the VR environment or real-world environment). Expected VR content may also be pre-determined, for example, if the VR content is scripted and/or upcoming VR frames are in queue or a buffer to be rendered. In another embodiment, expected VR content can also be determined and/or simulated by a learning model (for example, a recurrent neural network (RNN), etc.). User activity (e.g., how user may move in response to upcoming VR or real-world scenes) may be predicted based on previous user activity data and passthrough feed or recently rendered VR content. In an embodiment, passthrough customization system 120 may comprise or be coupled with an image recognition system to extract properties of images (e.g., low-level features or high-level features) from recently rendered VR content and from the passthrough feed. In another embodiment, the image recognition system may be used to extract properties of images from expected or scripted VR content which are known in advance (e.g., in queue to be rendered, simulated, etc.). Low-level features may comprise low-level statistical attributes of images such as color, patterns, shapes, textures, and so forth. High-level features may comprise high-level attributes such as identities or content of objects, entities, etc. Passthrough customization techniques may be generated based on the extracted features. In an embodiment, passthrough customization system 120 may customize the passthrough feed by one or a combination of a custom style filter, a style transfer neural network, or by selecting a VR content element (e.g., a VR object of interest) to add to the passthrough feed. The application of such customization technique(s), and the degree to which they are applied, may be determined based at least on the following statistical parameters: 1) duration of time for which the passthrough will remain enabled; 2) color intensity difference between the VR content and the passthrough feed; 3) the purpose or event for which passthrough is being enabled; and 4) the relative size of the passthrough feed display window (e.g., a portion of the VR screen showing the passthrough feed) in the VR environment. Other parameters may be used, such as scene information of the real-world environment (e.g., positions or proximity of real-world objects to the user, lighting or color of the real-world environment within the passthrough feed), and so forth.

In an example, passthrough customization system 120 may apply a custom style filter to the passthrough feed. An image recognition system may extract image features (e.g., visual properties of images) from the VR content. A custom filter may be generated based on the extracted features (e.g., low-level features such as color, patterns, textures, shapes, and the like), wherein applying the filter to portions of the passthrough feed result in the portions matching the style of the VR content. Meanwhile, high-level features (e.g., identities of entities, etc.) of the passthrough feed remain unchanged. For example, passthrough feed may comprise frames showing a natural view of a table. But the VR content image style comprises brightly colored 3D animation or modern cartoon styles (e.g., thick outlines, exaggerated geometric shapes, etc.). A custom filter may be created based on extracted low-level features of the VR content (e.g., 3D animation shapes and shading, or thick outlines and geometric shapes of a modern cartoon) and applied to the image of the real-world table. The high-level features of the table may be retained (e.g., the real-world entity in the passthrough feed continues to comprise a table), while the applied filter modifies the low-level features of the table. The resulting customized passthrough feed may comprise the table now rendered as a 3D animated table or modern cartoon-styled table.

In another example, passthrough customization system 120 may generate a style transfer network to modify the passthrough feed. A convolutional neural network (CNN) may extract features from the VR content (e.g., low-level attributes such as color, patterns, textures, shapes, etc.) to generate a style transfer network. When the style transfer network is applied to the passthrough feed, content rendering engine 114 may render the content of the passthrough feed, wherein the passthrough content has been translated to the style of the VR content (e.g., thereby retaining the high-level features of the passthrough content but modifying its low-level features).

In yet another example, passthrough customization system 120 may extract high-level features from the VR content corresponding to an object of interest (e.g., selected VR content element). The object of interest may be added to the passthrough feed window (e.g., by overlaying the object on top of the passthrough feed). The placement of the object may be based on the aforementioned statistical parameters. For example, the object may be placed such that it would not obstruct the user's view of an important real-world feature which requires the user's attention.

In some embodiments, the server 140 may include control circuitry 142 and storage 146 (e.g., RAM, ROM, Hard Disk, Removable Disk, etc.). The server 140 may also include an input/output path 144. I/O path 144 may provide device information, or other data, over a local area network (LAN) or wide area network (WAN), and/or other content and data to control circuitry 142, which includes processing circuitry, and storage 146. Control circuitry 142 may be used to send and receive commands, requests, and other suitable data using I/O path 144. I/O path 144 may connect control circuitry 142 (and specifically processing circuitry) to one or more communications paths.

Control circuitry 142 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 142 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 142 executes instructions for an emulation system application stored in memory (e.g., storage 146).

Memory may be an electronic storage device provided as storage 146 that is part of control circuitry 142. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 140 may retrieve user activity data, VR content data, and/or passthrough feed data from XR device 110, process the data as will be described in detail below, and forward the data to the passthrough customization system 120. XR device 110 may include one or more types of virtual reality (VR) devices, augmented reality (AR) devices, or mixed reality (MR) devices, or other consumer devices which may provide a user with an extended reality (XR) experience.

Client devices such as XR device 110 may operate in a cloud computing environment to access cloud services. In a cloud computing environment, various types of computing services for rendering XR content, storage or distribution are provided by a collection of network-accessible computing and storage resources, referred to as "the cloud." For example, the cloud can include a collection of server computing devices (such as, e.g., server 140), which may be located centrally or at distributed locations, that provide cloud-based services to various types of users and devices connected via a network such as the Internet via communication network 150. In such embodiments, user equipment devices may operate in a peer-to-peer manner without communicating with a central server.

Figure 3:
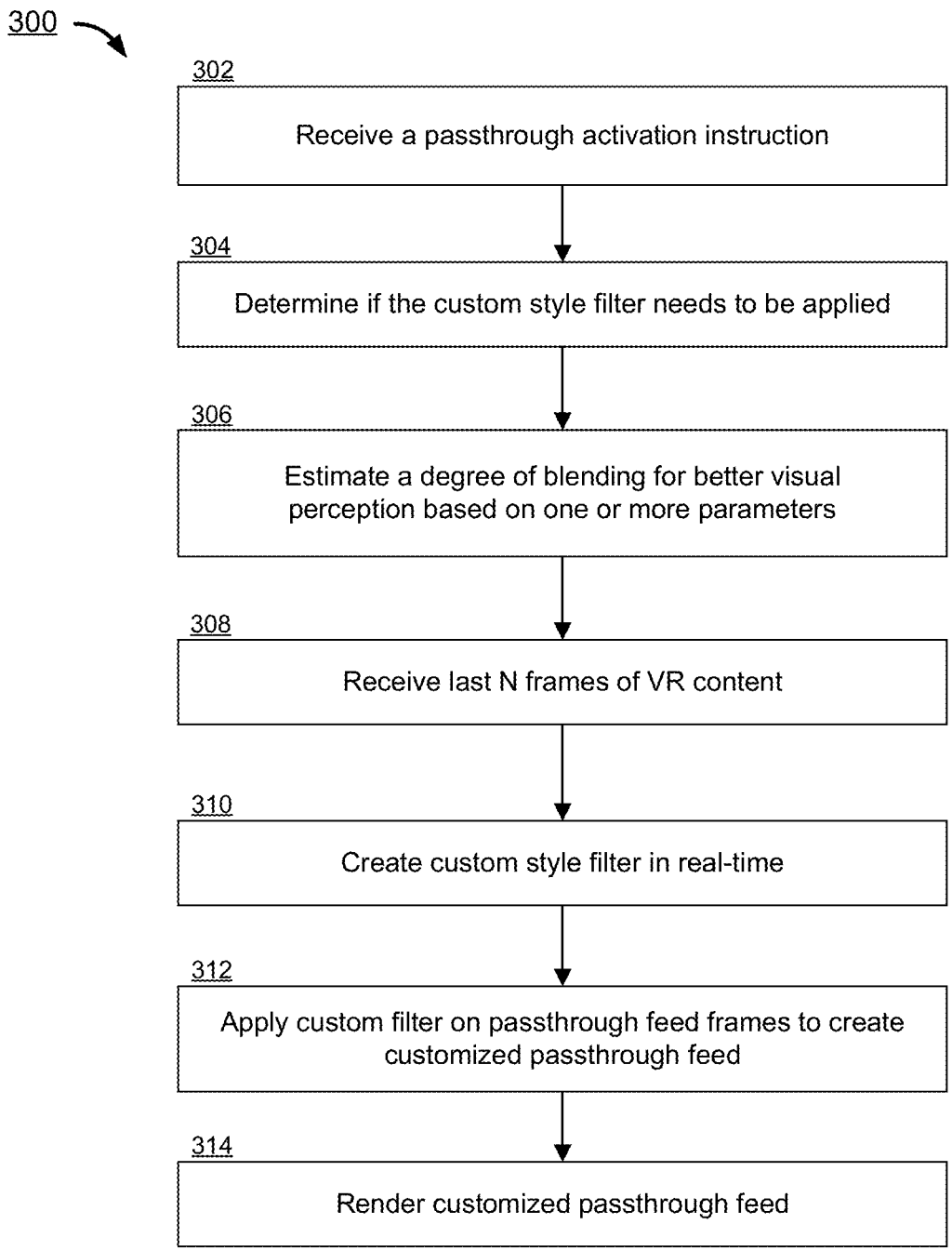
FIG. 3 is a flowchart showing illustrative steps involved in creating a customized style filter for generating a customized passthrough feed during a VR experience, in accordance with some embodiments of this disclosure.
Figure 4:
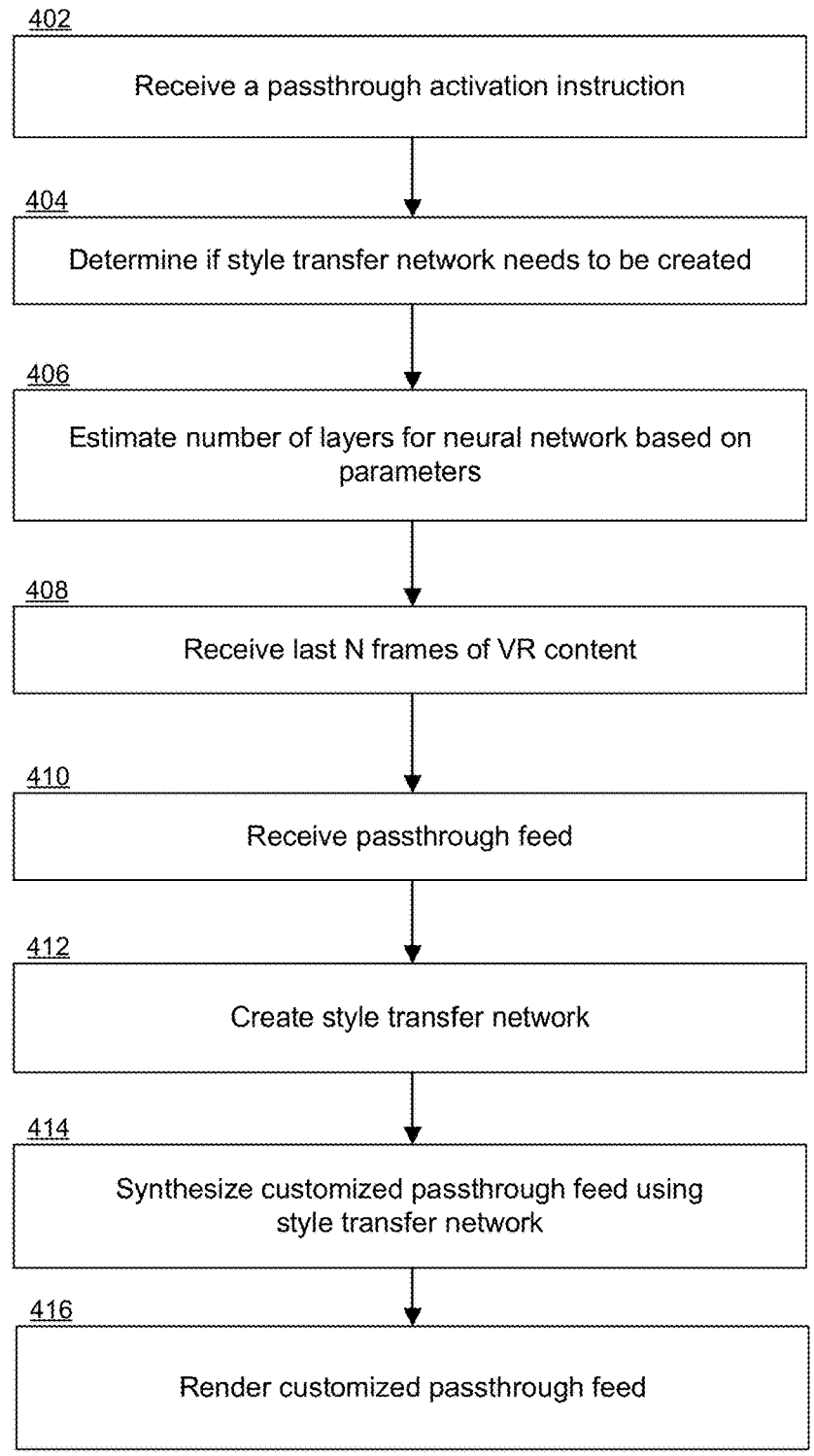
FIG. 4 is a flowchart showing illustrative steps involved in creating a style transfer neural network for generating a customized passthrough feed during a VR experience, in accordance with some embodiments of this disclosure.
Figure 5:
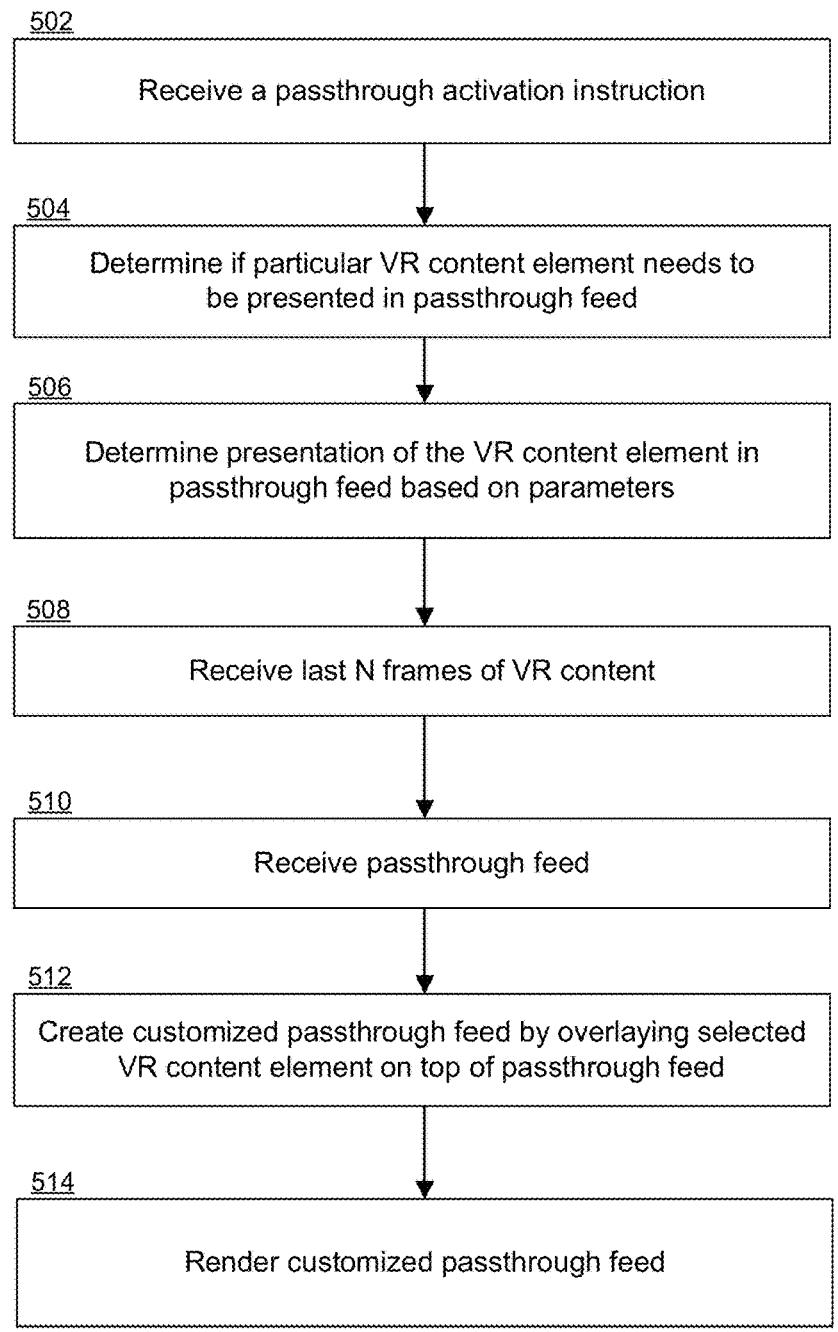
FIG. 5 is a flowchart showing illustrative steps involved in presenting a VR content element within a passthrough feed window, in accordance with some embodiments of this disclosure.

The systems and devices described in FIG. 1 enable not only the illustrative embodiment of FIG. 1, but also the execution of processes described in FIGS. 3-5. It should be noted that each step of processes described in FIGS. 3-5 is performed by the previously described control circuitry (e.g., in a manner instructed to control circuitry 142 or by a passthrough customization system). It should be noted that the embodiments of FIGS. 3-5 can be combined with any other embodiment in this description and are not limited to the devices or control components used to illustrate the processes.

Figure 2:
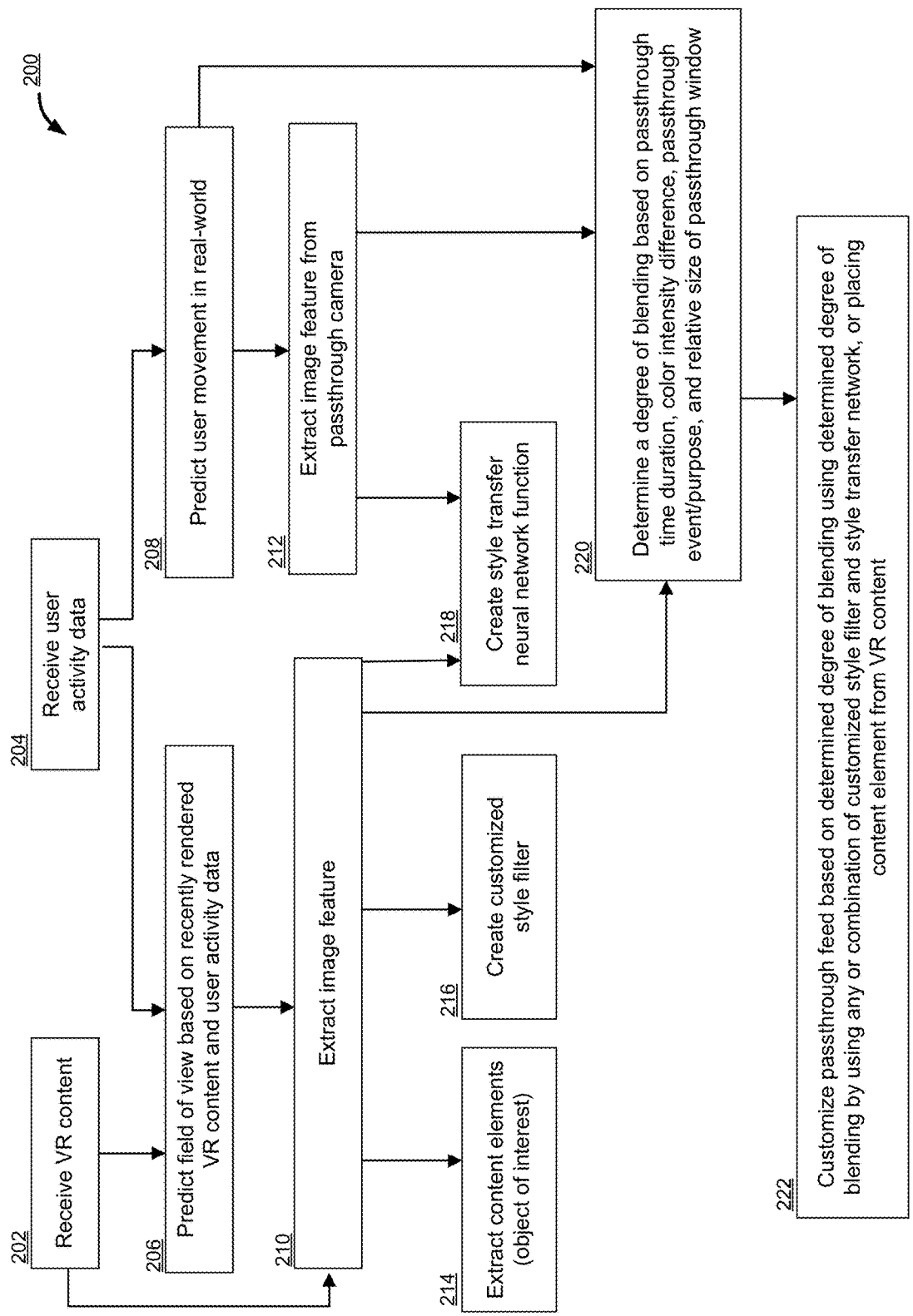
FIG. 2 is a flowchart showing illustrative steps involved in generating a customized passthrough feed during a VR experience, in accordance with some embodiments of this disclosure.

FIG. 2 is a flowchart 200 showing illustrative steps involved in generating a customized passthrough feed during a VR experience, in accordance with some embodiments of this disclosure. In an embodiment, at step 202, VR content is received. VR content may include image properties of a sequence of a recently rendered field of view of VR content. The sequence may comprise N number of frames, such as a frame set comprising the most recent 30 seconds of rendered VR content or other length of time. The number of frames may be based on user preferences, preconfigured settings, a trained machine learning model for predicting VR content, among others. Scene information may be extracted from the sequence, such as details relating to the virtual setting the user may be immersed in, the graphical style of the VR content (e.g., color intensity of VR content, realistic images, animated content, etc.), the pace of the VR content, degree of stimulation, and the like. For example, the VR content may be a slow-paced movie with a relatively static field of view, a quick-paced action video game wherein the user is interacting with many moving elements throughout his field of view, a rollercoaster ride where the field of view is changing rapidly, among others. Scene information may also include objects of interest, which may be VR content elements of significance to the user (e.g., requires the user's attention or is otherwise determined to be of interest to the user) in the VR environment.

At step 204, user activity data also is received. In an embodiment, onboard sensors such as outward-facing cameras, inertial measurement units, eye trackers, head trackers, and so forth, may be used to collect user activity data such as the user's movement, direction, or speed data (e.g., the user's 6 DOF (degrees of freedom) movement, direction, or speed data).

At step 206, the system may predict a set of expected VR frames and/or scenes, such as a predicted field of view of VR content. In an embodiment, the expected VR frames and/or scenes may comprise scripted VR content or upcoming VR frames and/or scenes in queue or buffer to be rendered. In another embodiment, the expected VR frames and/or scenes may be predicted based on the recently rendered VR content and user activity data. For example, based on recently rendered VR content elements in a fast-paced action video game (such as characters, buildings, items, obstacles, events such as explosions or thunderstorms, and so forth), and on the user's 6 DOF movements (such as punching or kicking motions, jumping, running, and so forth), speed (such as quick or accelerating movements), and the direction (such as facing a particular virtual character within a specific field of view, and so forth), future frames of the VR content may be predicted (such as the user's field of view over the next 30 seconds predicted to comprise a quick changing landscape of a path through which the user continues to run or jump while following a VR character).

Further in the embodiment, when the system predicts VR content, it may also identify and predict the position of an object of interest, region of interest, etc., in the VR content. The prediction of the position of the object of interest (or region of interest) may be based on user activity data and scene information of the VR content. For example, movement data (e.g., 6 DOF movement, direction, or speed data) of the user relative to scene information of the VR environment may be used to predict the position of the object of interest, or the position of the object of interest relative to the user's position in the real-world environment.

At step 208, the process may predict the user's movement in the real-world environment based on user activity data. Data relating to the user's real-world environment may be received (e.g., by way of a passthrough camera or external facing camera associated with the VR device) to supplement the user activity data. Scene information from the received VR content may also be used. For instance, user interaction with the VR environment may be determined based on extracted virtual scene information (e.g., identification of VR objects of interest, image features of the VR environment such as color intensity, graphical style, animations, and so forth) and user activity data (e.g., user's eye movements, facial expressions, bodily movements, etc.) occurring and corresponding with the scene information in real-time. The user activity data may be collected by various sensors or cameras, such as eye trackers or inward facing cameras (for tracking eye movements, facial expressions such as winking, frowning, and so forth), external cameras (for tracking bodily movements such as arm and leg movements), wearable devices such as gloves, rings, haptic suits, etc. (for tracking bodily movements, measuring user's biometric data such as heartrate, and so forth), among others. In an example, user data activity indicating that the user is making quick and active movements (such as jumping or running in a wide range of directions in relation to the VR environment) and real-world data indicating that physical objects are nearby (such as furniture or a person walking by the user) may be used to predict that the user's continued movements in relation to the VR experience may result in the user coming into contact with the furniture or obstructing the person's path.

Further in the embodiment, the system may also identify and predict the position of an entity of interest (e.g., a real-world object which is of significance to the user, such as a real-world object which requires the user's attention or corresponds to the user's interests, etc.). Prediction of the entity of interest may be based on user activity data and scene information of the real-world environment. For example, movement data (e.g., 6 DOF movement, direction, or speed data) of the user relative to scene information of real-world environment may be used to predict the position of the entity of interest, or the position of the entity of interest relative to the user's position in the real-world environment.

In an embodiment, the predicted user's movement may trigger activation of the passthrough feed. For example, if the user is predicted to approach an entity of interest (e.g., a real-world physical object which the user should direct his attention to) or that the user will be in a position where an oncoming real-world hazard may approach the user, passthrough feed may be triggered and will stream on the VR display (e.g., such that the user may see the entity of interest). In other embodiments, activation of the passthrough feed may be triggered based on other events (e.g., the end of a VR session, impending real-world hazards, and so forth), manual instructions, preconfigured settings (e.g., based on user interests), analysis by artificial intelligence systems (e.g., AI detection of real-world danger, AI management of VR session duration, etc.), and so forth.

According to some embodiments, when the passthrough feed is activated, the system may determine whether to customize the passthrough feed based on at least the predicted VR content, predicted user movement in the real-world environment, or the passthrough feed content.

At step 210, image features (also referred to as image properties) from the expected VR frames (and/or scenes) and/or the recently rendered frames (and/or scenes) may be extracted. In an embodiment, the expected VR frames or scenes may comprise upcoming VR frames or scenes in queue or buffer to be rendered. In another embodiment, the expected VR frames may be predicted based on the recently rendered VR content and simulated and/or rendered (e.g., by way of learning algorithms). Additionally, at step 212, image features of the user's real-world environment may be extracted from the passthrough feed. In an embodiment, image properties of the frames from the realities may comprise low-level features, high-level features, or a combination thereof. Such image properties may be extracted by way of an image recognition system. Low-level features of images may include color attributes, pattern attributes, shape, texture, and the like. High-level features of images may include object identification, such as recognition of objects of interest (e.g., objects in the VR environment), entities of interest (e.g., entities in the real-world environment), semantics, and so forth. The extracted image features (e.g., from either or both realities) may be used to customize the passthrough feed.

According to some embodiments, the system may customize the passthrough feed by applying a custom style filter, a style transfer network, or adding extracted VR content elements (e.g. objects of interest) to the passthrough feed. Combinations of these customizations or other customization techniques may be used. Selecting the customization technique may depend on various factors such as scene information from predicted VR content and/or the real-world feed, predicted user movement in the real-world environment, and so forth. Further in an embodiment, the decision to implement a particular customization technique may be based on at least one of the following passthrough customization parameters: 1) duration of time for which the passthrough will remain enabled; 2) color intensity difference between the VR content and the passthrough feed; 3) the purpose or event for which passthrough is being enabled; and 4) the relative size of the passthrough feed display window (e.g., a portion of the VR screen showing the passthrough feed) in the VR environment. Other parameters for optimizing user experience when transitioning realities may be applied. As the conditions relating to the parameters change throughout the user experience (e.g., a user's VR session), the passthrough feed may be customized dynamically. For example, different customization techniques, or applying a particular customization technique to different degrees (such as the degree of blending transitions between the realities) may be implemented as conditions change in the VR environment, the real-world environment, and the user's interaction with the two realities. In an embodiment, the customization technique implemented may optimize the matching of the style of the passthrough feed and the VR content. In another embodiment, the customization technique implemented may accentuate particular differences between passthrough content and VR content and/or apply specific features to draw the user's attention to a real-world element in the passthrough feed, For example, if a hazardous situation in the real-world environment is detected (for instance, scene information from the passthrough feed and user movement and speed within the VR environment indicate a likely collision with the user and a physical object), implementation of the style transfer filter or custom style filter may include specific markings such as a colorized style (e.g., red coloring) to denote the severity of the situation. Moreover, different colorings may be used to denote different levels of severity of the situation.

In another embodiment, the custom style filter may be selected for customizing the passthrough feed based on availability of network resources. For example, when low computational resources are available to the system and/or time constraints are present (such as a limited time between rendering the VR content and activation of the passthrough command), the system may determine that application of the custom style filter is appropriate (e.g., preference over implementing a style transfer network).

At step 214, the passthrough feed may be customized by extracting an object of interest (selected VR content element) from the VR content and adding the object of interest to the passthrough feed. For example, high-level features (e.g., object- or entity-identifying image properties, or content of images) may be extracted from a sequence of recently rendered or predicted frames of VR content, to identify the object of interest in the VR environment (or identify the entity of interest if extracting from the passthrough feed). When passthrough feed is activated, it may be displayed in a portion of the VR display obstructing some VR elements, including some of the identified objects of interest. Based on user preferences, preconfigured settings, etc., the system may determine whether an object of interest (which would otherwise be obstructed by the passthrough feed or may be overlooked if not positioned where the passthrough feed is, etc.) is significant enough to the user as to be displayed in the passthrough feed. The object of interest may be presented within the passthrough feed as an overlay on top of a region of the passthrough feed window. In another example, other blending techniques may be used to present the object of interest in the passthrough feed window, such as by compositing or transparency setting (e.g., creating transparency within a selected region of the passthrough feed display window which is overlaid on top of the VR object of interest), and so forth. In another embodiment, the object of interest from the VR content that matches at least a feature of the passthrough feed can be extracted from the VR content and placed within the passthrough feed window. Two images may be similar in content if their high-level features as extracted by an image recognition system are close in Euclidean distance. In an example, when adding a VR object of interest to a passthrough feed window, the placement of the object may be in a position of a corresponding real-world object. Object matching, entity matching, semantic matching may be used to identify and place the VR object of interest. In an example, the VR object may be overlaid on top of the passthrough feed in the position where the VR object would have been displayed in the VR content frames if the passthrough feed had not been activated. In another example, the corresponding real-world object may be a semantic match or ontological match with the VR object of interest, for instance, the objects are of similar size, are associated with similar significance (e.g., degree of importance to the user in relation the environment, such as whether the user needs to interact with the object within a specific period of time or the object needs to be constantly displayed within the user's field of view, etc.). For example, a VR object of interest comprising a chart showing the health status of an avatar of the user may be of high significance (e.g., the system may determine, based on user activity or preferences, that the health chart should be displayed consistently throughout the VR session) and may be positioned over the passthrough feed where a real-world wall clock would be displayed otherwise.

At step 216, the passthrough feed may be customized by using a custom style filter. The custom style filter may include adjustments to color, intensity (luminance), and so forth. In an embodiment, a customized image filter may be generated from extracted features of the VR content. The filter may be applied on the passthrough feed to smoothen the transition between the VR content and the passthrough feed. For example, low-level features, such as color attributes, patterns, textures, and the like, may be analyzed and extracted (e.g., by an image recognition system) from a sequence of recently rendered or predicted frames of VR content. Because two images may be similar in style if their low-level features share the same spatial statistics, the extracted low-level features (from the VR content) may be used to create a style filter (such as color filter, pattern filter, texture filter, and so forth) that would render the filtered image subject (e.g., filtered passthrough images) to share spatial statistics with the source image (e.g., the extracted VR features). When the passthrough feed is activated, the filter is applied to the frames of the passthrough feed such that output frames from the passthrough feed match the spatial statistics of the VR content. Moreover, images in the filtered passthrough feed retain the same high-level features (e.g., same Euclidian distance) as they would in an unfiltered passthrough feed, resulting in the identity of entities in the passthrough feed to remain unchanged while being rendered in a different (e.g., VR) style.

In yet another embodiment, the custom style filter may comprise pixel-manipulation-based filters. Pixel values may be represented in the form of YUV values, RGB values, etc. The pixel values may be averaged from the recently rendered N frames of VR content and the resulting average value may be used to update the pixel values of the passthrough frames overlaying the corresponding VR pixel position. The positions of the passthrough feed pixels to be manipulated may be identified. Based on the type of image property which the custom style filter targets (e.g., filter for color, brightness, contrast, saturation, gamma correction, and image properties or combinations of image properties), application of the filter can manipulate the respective image properties of the passthrough pixels.

At step 218, the passthrough feed may be customized by using a style transfer neural network (also referred to as a style transfer network) The style transfer network may blend the passthrough feed with the style of the VR content. The style transfer network may comprise a convolutional neural network (CNN) which receives a content image (e.g., high-level features of the passthrough feed extracted by the CNN) and a style reference image (e.g., low-level features of recently rendered or predicted VR content extracted by the CNN) and blends them such that the output image resembles the content image rendered in the style of the style reference image. In some embodiments, the style transfer network may comprise a recurrent neural network (RNN), for example, where scenes and/or the environment of the passthrough feed within the VR experience or during the VR experience are similar to a particular degree.

At step 220, the system determines the degree of blending to be applied with the selected customization technique, such as the degree of blending the styles between the realities when applying a custom style filter or a style transfer neural network. In another embodiment, when customizing the passthrough feed by placing a selected VR content element in the passthrough feed window, the system may determine the presentation (for example, placement on the passthrough feed) of the VR content element. The system may use any one of or a combination of the aforementioned passthrough customization parameters (e.g., 1) duration of time for which the passthrough will remain enabled; 2) color intensity difference between the VR content and the passthrough feed; 3) the purpose or event for which passthrough is being enabled; and 4) the relative size of the passthrough feed display window in the VR environment). Determining the degree of blending by the custom style filter or style transfer network or the presentation of a VR object of interest in the passthrough feed based on the parameters is described in further details in FIGS. 3-5. In other embodiments, the degree of blending may be a configurable setting. For example, the user may select from pre-set degrees of blending (e.g., low, medium, high), such as via a slider menu or other UI element displayed to the user.

At step 222, the passthrough feed is customized based on the determined degree of blending (or the determined presentation) by using any one of or a combination of the custom style filter, style transfer network, or placing the VR content element in the passthrough feed. Such customizations may be implemented dynamically based on conditions of the real-world environment and/or VR environment in real-time. According to other embodiments, the customization of the passthrough feed (e.g., by way of a custom filter, style transfer network, marking a VR object of interest to place in passthrough feed, etc.) may be done in advance. For example, when a user initiates a VR session (e.g., begins playing a particular VR game, movie, or other VR content), a custom style filter, style transfer network, and/or VR content element associated with the VR content of the VR session (e.g., game, movie, etc.) can be temporarily downloaded on the VR device. When passthrough feed is enabled, the system may use the temporarily downloaded custom style filter, for example, to change the style of the real-world feed. In an embodiment, the statistical parameters (e.g., passthrough customization parameters) and functions (e.g., style transfer network) or filters associated with the game or VR content, or the priority (e.g., for overlaying over the passthrough feed) of the VR content element can be part of the manifest file (such as for each frame or segment) of the temporarily downloaded VR content.

FIG. 3 is a flowchart 300 showing illustrative steps involved in creating a custom style filter for generating a customized passthrough feed during a VR experience, in accordance with some embodiments of this disclosure. In an embodiment, at step 302, a passthrough activation instruction is received. The passthrough activation instruction may be triggered manually, such as when the user decides to end or pause a VR session or a portion of the VR session, or the user wants to view passthrough feed through a portion of his field of view in the VR device. The passthrough activation instruction may also be programmatically triggered, such as based on certain events (e.g., incoming phone call, avoid an accident or dangerous outdoor condition, presence of real-world obstruction or person within a certain range, etc.), user activity (gestures, user's heart rate reaches a particular value, user falls asleep, etc.), and so forth.

At step 304, the process determines whether a custom style filter needs to be applied. In an embodiment, the custom style filter may be applied based on predicted frames of VR content, predicted user interaction in the predicted VR environment, and/or predicted user movement in the real-world environment. The system may predict and simulate (or render) an expected field of view of VR content based on recently rendered frames of a field of view of VR content and/or user activity data. The predicted frames of VR content may comprise predicted data based on features of the VR environment in the upcoming frames and how the user will interact within the predicted VR environment. Predicted user movement in the real-world may be based on user activity data. In another embodiment, the expected field of view of VR content may comprise scripted VR frames which are in queue or buffered to be rendered. The custom style filter may be determined as an appropriate technique for customizing the passthrough feed based on the predicted VR frames and user movement. In another embodiment, the custom style filter may be selected for customizing the passthrough feed based on availability of network resources. For example, when low computational resources are available to the system and/or time constraints are present (such as a limited time between rendering the VR content and activation of the passthrough command), the system may determine that application of the custom style filter is appropriate (e.g., preference over implementing a style transfer network).

In an embodiment, the custom style filter may also be determined to be an appropriate technique for customizing the passthrough feed based on parameters, such as an estimated (or preconfigured) duration of time for which the passthrough will remain enabled, the color intensity difference between the VR content and passthrough feed, the event or purpose for which the passthrough feed is enabled, and/or the relative size of the passthrough feed display window in the VR environment. Other parameters may also be used to determine whether the custom style filter should be applied, such as parameters which impact whether the customized passthrough would improve user experience during transitions between passthrough feed and VR content. Various combinations of such parameters may be used, and various weights may be given to each parameter in the determination to apply a custom filter. For example, if the activation of passthrough feed is for a particularly short duration of time, there are small differences in color intensity between VR content and passthrough feed features, the passthrough feed-triggering event require user's immediate attention to real-world conditions or objects, and the passthrough feed display window is of a particularly small size in the VR environment, and so forth, the system may determine that application of custom filter to the passthrough feed is not needed (or should be removed therefrom, if already applied). In another example, if a higher weight is given to the color intensity parameter than other parameters, in a situation where color intensity differences between the activated passthrough feed and VR content exceed a particular value, a custom filter may be applied to smoothen the transition between the content of the two realities as rendered.

At step 306, the process estimates a degree of blending (e.g., to be achieved by applying the custom style filter) for better visual perception based on at least one of the aforementioned parameters. To enable a more gradual transition between VR content and passthrough feed (also referred to as passthrough feature), the custom filter may be applied or updated dynamically to blend the image properties of the passthrough feed and the VR content. In an embodiment, the degree of blending may be based on the duration (e.g., estimated or preconfigured) of time for which the passthrough will remain enabled. For example, the custom filter may initially be more biased toward features of the VR content and based on a predicted or given passthrough time duration (e.g., duration for which passthrough feature will remain enabled), the system may provide weightage to features of the unfiltered real-world image frames from the passthrough feed. For instance, a custom filter (e.g., adjusted brightness, contrast, saturation, etc. to match features of the VR content) may be initially applied to the passthrough feed when it is triggered within the VR display window. Unfiltered passthrough feed (e.g., in natural color) may be gradually displayed (e.g., gradual removal or decrease of custom style filtering of the passthrough feed) within the user's field of view of the VR device if the passthrough camera remains activated over a particular length of time. In another embodiment, the duration of time for which the user has been immersed in a particular VR environment may be taken into consideration. For example, if the user has been in the VR environment for over a specific duration, the system may take a longer time to transition and fully show the unfiltered colored real-world feed.

In another embodiment, the degree of blending may be based on the color intensity difference between the VR content and the passthrough feed. When passthrough functionality is enabled, frames from the recently rendered VR and/or the predicted VR content may be compared with the passthrough feed to analyze the intensity difference between the images. For example, if the intensity differences exceed a particular value, the system may apply a custom filter to smoothen the transition at the intersection of the passthrough feed and the VR content. Usually in VR rendering, a single line boundary may be used to differentiate between passthrough feed and VR content. In an embodiment, the system may create and apply a custom filter to the line boundary, resulting in a gradual increase or decrease of intensity between the passthrough feed and the virtual content.

In yet another embodiment, the degree of blending may be based on an event triggering the passthrough feed or the purpose for activating the passthrough feed. For example, if an event requires user attention to the passthrough feed, such as the user approaching a dangerous object or a possibility of a collision, etc., the system may apply a reduced degree of blending or no style filter, emphasizing the contrasting difference between the passthrough feed and VR content. This can prevent the mixing of realities for the user. In another example, if passthrough is enabled in order to facilitate a mixed reality user experience, the system may generate and apply the style filter to a degree based on user preferences, preconfigured settings, to optimize the average user's experience, etc.

Also in another embodiment, the degree of blending may be based on the relative size of the passthrough feed display window in the VR environment. The size of the passthrough feed window may comprise a portion of the VR screen or field of view, through which the passthrough field is shown. The size and/or position of the passthrough feed may be determined based on the portion of the passthrough feed that needs to be shown. For example, the passthrough feed window may be positioned in a corner of the viewing area of the VR display and its size may occupy a portion (e.g., 10%, 50%, etc.) of the viewing area. If the window size is smaller than a particular size, the system may bypass customization of the passthrough feed to prevent mixing of reality or reduce likelihood that a user would overlook such a small display window. In another embodiment, if the window exceeds a particular size, the system may apply a custom filter. In yet another embodiment, a gradual filter may be applied as the passthrough feed window changes size. For example, the window may dynamically increase in size and a higher degree of blending may be applied to the custom filter. In another example, the custom filter may be applied based on the position of the passthrough feed window relative to the viewing area of where the VR content is displayed, such as in the center of the viewing area, a corner, whether placement of the passthrough feed window would otherwise obstruct viewing of a significant feature of VR content, and so forth. In another embodiment, when the relative size of the passthrough feed display window is greater than the VR content window, the system may apply a custom filter to the VR content (e.g., thereby generating a filtered rendering of VR content instead of, or in addition to, a customized passthrough feed).

In yet another embodiment, the degree of blending may be based on other criteria suitable to optimize the user's XR experience while notifying the user of real-world objects and occurrences. For example, such criteria may include scene information of the real-world environment, such as positions of real-world objects relative to the user. When a physical object is detected (e.g., by outward facing cameras, other imaging sensors) to be within a particular proximity to the user, the degree of blending by the custom style filter or style transfer network may be more biased toward the style of real-world features, and/or the system may gradually display an unfiltered view of the passthrough feed. In another example, the degree of blending may be based on characteristics of features in the real-world environment, such as lighting or color in the real-world environment. For example, the user may need to interact with a physical laptop positioned on top of a white table. The default coloring for an unfiltered passthrough feed may be black and white. A custom filter or style transfer network may be applied to reduce eye discomfort to the user. A soft white style filter may be determined, based on the aforementioned parameters, to be used in the custom style filter or transfer style network. However, the white style filter would be insignificant in smoothening the transition between the realities where the passthrough feed is already in black and white. Thus, the custom filter or style transfer network may be adjusted to apply, for example, a red coloring style filter instead.

When blending features of the passthrough feed using the custom style filter, the system may balance the custom style filter to prevent mixing of realities in the user experience. For example, the system may maintain a visual distinction between the VR content and the customized passthrough feed, such as by inducing virtual opaqueness. The degree of virtual opaqueness may be based on user preferences and/or a combination of the aforementioned parameters.

At step 308, the process receives recently rendered frames of the VR content as rendered on the VR device. The number (e.g., N) of frames may be based on user preferences or preconfigured settings. In other embodiments, the number of frames may be determined based on a trained machine learning model for extracting image features from VR content and/or predicting upcoming frames of VR content. For example, the number of frames may comprise the last 30 seconds of rendered VR content. In another embodiment, predicted frames of VR content may be received. For example, M number of frames (such as 30 seconds of content) may be predicted and obtained.

At step 310, the custom style filter is created. In an embodiment, the custom style filter is created in real-time using image features extracted from the recently rendered frames of VR content and/or predicted frames of VR content. In an embodiment, the custom style filter may comprise pixel-manipulation-based filters. Pixel values may be represented in the form of YUV values. Pixel values from extracted images from the recently rendered N frames of VR content and/or predicted M frames of VR content may be averaged. The averaged pixel values of the VR content may be used to update the pixel values of image features of the real-world feed (for instance, the passthrough feed pixels overlaying the same pixel position as corresponding pixels in the VR content). For pixel-based processing of features from the passthrough feed, the positions of the pixels to be manipulated (e.g., pixels of the passthrough feed) may be identified. Based on the custom style filter, one or more properties of the passthrough feed pixels may be manipulated to obtain an output of a customized passthrough feed pixel. The properties that are manipulated may include brightness, contrast, saturation, gamma correction, blur, levels, curves, sepia, color balance, vibrance, exposure, sharpening, and so forth. In an embodiment, pixels may be manipulated by way of vignetting compensation, lens distortion correction, local exposure corrections, color adjustments (e.g., adjusting white balance, etc.), noise filtering or reduction, chroma subsampling or scaling, luma mapping or subsampling, sharpening filter, edge filter, and the like.

In some embodiments, the system may build a model based on the raw image input pixels extracted from images of the recently rendered and/or predicted VR content. The model may be used to convert the raw image pixels into a complex representation of the features of such images. The raw image input pixels may be represented using various color models, such as RGB model, YUV model, and the like. In an example, the system may copy image attributes such as color properties, brightness, contrast, blurriness, sharpness, and the like, from raw image pixels corresponding to the extracted images of the VR content and create a custom filter based on the attributes. The attribute-specific custom filter may then be applied to the passthrough feed, for example, to each pixel in an image in the passthrough feed (e.g., by way of pixel point processing or pixel-based image processing). In another embodiment, neighborhood processing may be used to implement an appropriate function of each to present a modified pixel when rendering the passthrough feed content to the user. For example, the filter (e.g., comprising a mask and function) may be applied iteratively to windows of pixels (e.g., neighborhoods) of the image of the passthrough feed to generate customized passthrough feed content.

At step 312, the custom filter is applied to the passthrough feed to create the customized passthrough feed. In an embodiment, the custom filter may be applied to the degree of blending as determined based on the aforementioned parameters. Once customized, the passthrough feed is rendered within the passthrough feed window of the VR display at step 314.

FIG. 4 is a flowchart 400 showing illustrative steps involved in creating a style transfer neural network (also referred to as a style transfer network or style transfer function) for generating a customized passthrough feed during a VR experience, in accordance with some embodiments of this disclosure. In an embodiment, at step 402, a passthrough activation instruction is received. The passthrough activation instruction may be triggered manually, such as when the user decides to end or pause a VR session or a portion of the VR session, or the user wants to view passthrough feed through a portion of his field of view in the VR device. The passthrough activation instruction may also be programmatically triggered, such as based on certain events (e.g., incoming phone call, avoid an accident or dangerous outdoor condition, presence of real-world obstruction or person within a certain range, etc.), user activity (gestures, user's heart rate reaches a particular value, user falls asleep, etc.), and so forth.

At step 404, the process determines whether a style transfer network needs to be created and used. In an embodiment, the determination to create the style transfer network may be based on predicted frames of VR content, predicted user interaction in the predicted VR environment, and/or predicted user movement in the real-world environment. The system may predict a field of view of VR content based on recently rendered frames of a field of view of VR content and/or user activity data. The predicted frames of VR content (e.g., a set of next segments of VR content) may be queued or buffered for rendering and may comprise predicted data on features of the VR environment in the upcoming frames and how the user will interact within the next segments in the expected VR environment. Predicted user movement in the real-world may be based on user activity data. The style transfer network may be determined as an appropriate technique for customizing the passthrough feed based on the predicted VR frames and user movement.

In an embodiment, the style transfer network may also be determined to be an appropriate technique for customizing the passthrough feed based on parameters, such as the duration of time for which the passthrough will remain enabled, the color intensity difference between the VR content and passthrough feed, the event or purpose for which the passthrough feed is enabled, and/or the relative size of the passthrough feed display window in the VR environment. Other parameters may also be used to determine whether the style transfer network should be applied, such as parameters which impact whether the customized passthrough would improve user experience during transitions between passthrough feed and VR content. Various combinations of such parameters may be used, and various weights may be given to each parameter in the determination to create and use a style transfer network. For example, if the activation of passthrough feed is for a particularly short duration of time, there are small differences in color intensity between VR content and passthrough feed features, the passthrough feed-triggering event require user's immediate attention to real-world conditions or objects, and the passthrough feed display window is of a particularly small size in the VR environment, and so forth, the system may determine that application of a style transfer network to the passthrough feed is not needed (or should be removed therefrom, if already applied). In another example, if a higher weight is given to the duration than other parameters, in a situation where the duration of the passthrough exceeds a particular length of time, a style transfer network may be implemented to smoothen the transition between the content of the two realities as rendered as to minimize cognitive dissonance or eyestrain to the user caused by long periods of displays of jarring contrasts between the realities.

At step 406, the process estimates a number of layers to be used in the neural network based on at least one of the aforementioned parameters. The more layers the neural network model uses, the higher the quality (e.g., higher degree) of blending will be between the VR content and the passthrough feed. To enable a more gradual transition between VR content and passthrough feed, the style transfer network may be implemented or updated dynamically to blend the image properties of the passthrough feed and the VR content. For example, the number of layers may correspond to the degree of blending desired. In another example, the system may generate an output from an intermediate layer to correspond with the desired degree of blending. In an embodiment, the number of layers may be based on the duration of time for which the passthrough will remain enabled. For example, the style transfer network may initially be more biased toward features of the VR content and based on an estimated or given passthrough time duration (e.g., duration for which passthrough feature will remain enabled), the system may provide weightage to features of the unfiltered real-world image frames from the passthrough feed. For instance, a style transfer network (e.g., neural network model which enables output of an image of the passthrough feed in the style of the VR content) may be initially applied to the passthrough feed when it is triggered within the VR display window. Unfiltered passthrough feed (e.g., in natural color) may be gradually displayed (e.g., gradual removal or decrease application of style transfer network application to the passthrough feed) within the user's field of view of the VR device if the passthrough camera remains activated over a particular length of time. In another embodiment, the duration of time for which the user has been immersed in a particular VR environment may be taken into consideration. For example, if the user has been in the VR environment for over a specific duration, the system may take a longer time to transition and fully show the unfiltered colored real-world feed.

In another embodiment, the number of layers may be based on the color intensity difference between the VR content and the passthrough feed. When passthrough functionality is enabled, frames from the recently rendered VR and/or expected VR frames (e.g., which have been queued for rendering) may be compared with the passthrough feed to analyze the intensity difference between the images. For example, if the intensity differences exceed a particular value, the system may apply a style transfer network with a specific number of layers (e.g., within a particular range) to smoothen the transition at the intersection of the passthrough feed and the VR content. In another example, the number of layers may correspond to the magnitude of intensity differences. The higher the intensity differences, the more layers may be applied to achieve higher blending of the greater contrast between the image styles of the realities.

In yet another embodiment, the number of layers may be based on an event triggering the passthrough feed or the purpose for activating the passthrough feed. For example, if an event requires user attention to the passthrough feed, such as the user approaching a dangerous object or a possibility of a collision, etc., the system may implement a reduced number of layers in the style transfer network (e.g., thereby reducing the degree of blending) or may not apply the style transfer network at all, resulting in an emphasis of the contrasting difference between the passthrough feed and VR content. This can prevent the mixing of realities for the user. In another example, if passthrough is enabled in order to facilitate a mixed reality user experience, the system may generate and apply the style transfer network comprising a number of layers based on user preferences, preconfigured settings, to optimize the average user's experience, etc.

Also in another embodiment, the number of layers may be based on the relative size of the passthrough feed display window in the VR environment. The size of the passthrough feed window may comprise a portion of the VR screen or field of view, through which the passthrough field is shown. The size and/or position of the passthrough feed may be determined based on the portion of the passthrough feed that needs to be shown. For example, the passthrough feed window may be positioned in a corner of the viewing area of the VR display and its size may occupy a portion (e.g., 10%, 50%, etc.) of the viewing area. If the window size is smaller than a particular size, the system may bypass customization of the passthrough feed to prevent mixing of reality or reduce likelihood that a user would overlook such a small display window. In another embodiment, if the window exceeds a particular size, the system may customize the passthrough feed through the style transfer network. In yet another embodiment, a gradual filter may be applied as the passthrough feed window changes size. For example, the window may dynamically increase in size and a higher number of layers may be used in the style transfer network. In another example, images of the passthrough feed may be fed through the style transfer network based on the position of the passthrough feed window relative to the viewing area of where the VR content is displayed, such as in the center of the viewing area, a corner, whether placement of the passthrough feed window would otherwise obstruct viewing of a significant feature of VR content, and so forth. In another embodiment, when the relative size of the passthrough feed display window is greater than the VR content window, the system may feed images of VR content through the style transfer network (e.g., thereby generating a customized rendering of VR content in the style of the passthrough feed, e.g., in a real-world style, instead of, or in addition to, a customized passthrough feed).

When stylizing features of the passthrough feed using the style transfer network, the system may balance the number of layers in the style transfer network, or determine an intermediate layer for output, to prevent mixing of realities in the user experience. For example, the system may maintain a visual distinction between the VR content and the customized passthrough feed, such as by inducing virtual opaqueness. The degree of virtual opaqueness may be based on user preferences and/or a combination of the aforementioned parameters.

At step 408, the process receives recently rendered frames of the VR content as rendered on the VR device. The number (e.g., N) of frames may be based on user preferences or preconfigured settings. In other embodiments, the number of frames may be determined based on a trained machine learning model for extracting image features from VR content and/or predicting upcoming frames of VR content. For example, the number of frames may comprise the last 30 seconds of rendered VR content. In another embodiment, expected frames of VR content may be predicted and simulated and/or rendered, or scripted frames of VR content may be queued for rendering. For example, M number of expected frames (such as 30 seconds of content) may be predicted and obtained.

At step 410, the process receives passthrough feed captured by a passthrough camera (e.g., an outward facing camera coupled to the VR device). Images or portions from the passthrough feed may be selected and extracted for customization by way of the style transfer network. At step 412, the style transfer network is created with the estimated number of layers to blend the VR content and the passthrough feed. At step 414, the process synthesizes the customized passthrough feed using the style transfer network. At step 416, render customized passthrough feed. In an embodiment, the style transfer network may comprise a convolutional neural network. The style transfer network may be used to optimize the passthrough feed, for instance, by matching the content statistics of the passthrough feed and the style statistics of the VR content frames (e.g., of recently rendered and/or predicted VR content) by estimating and using a particular number of frames based on the aforementioned parameters. Style statistics may be extracted by the style transfer network from images of the VR content frames and used to transform the passthrough feed into a customized real-world feed (e.g., thereby synthesizing a new image of the passthrough feed content in the graphical style of the VR content). For example, low-level features (e.g., color attributes, edges, patterns, textures, etc.) of the VR content may be extracted while high-level features (e.g., objects of interest, entities, semantics, etc.) of the real-world feed may be extracted. Through the style transfer network, the extracted real-world objects may be stylized using the extracted VR styles. In another embodiment, the passthrough feed may comprise a partially blended real-world feed (such as by way of applying selected portions of the passthrough feed to input through the style transfer network and/or using a particular number of layers or using an intermediate layer output, and so forth).

In an embodiment, when building and applying a style transfer network (e.g., comprising a convolutional network) from a sequence of VR content frames in real-time, the system may limit the use of the network to a predetermined set of the initial layers (e.g., wherein the first few layer activations represent low-level features such as edges, color, textures, and other low-level or statistical attributes). Limiting the style transfer network to the first few layers can allow it to perform the style transfer on passthrough feed efficiently, such as under time constraints. In another embodiment, if the passthrough feed is activated and enabled within a few seconds of beginning the rendering of the VR content, the system may consider a fewer number of intermediate layers of the style transfer network. The style transfer network may be updated dynamically based on the most recent N frames of the VR content. For example, if there should be a gradual transition between the passthrough feed and VR content based on the recently rendered frames of VR content, wherein the passthrough feed is initially shown true to its real-world style and gradually changes to resemble the style of the VR content as the user spends more time immersed in the two realities, then the style transfer network may be updated to consider an increased number of intermediate layers.

In another embodiment, where less blending between the VR content and the real-world feed is desired (e.g., where most distinctive contrast between the realities is desired, such as to alert the user of a physical hazard in the real-world environment), the system may use less layers in the style transfer network and/or use an intermediate layer output (e.g., partially blended style).

FIG. 5 is a flowchart 500 showing illustrative steps involved in presenting a VR content element (such as an object of interest in the VR environment) within a passthrough feed window, in accordance with some embodiments of this disclosure. In an embodiment, at step 502, a passthrough activation instruction is received. The passthrough activation instruction may be triggered manually, such as when the user decides to end or pause a VR session or a portion of the VR session, or the user wants to view passthrough feed through a portion of his field of view in the VR device. The passthrough activation instruction may also be programmatically triggered, such as based on certain events (e.g., incoming phone call, avoid an accident or dangerous outdoor condition, presence of real-world obstruction or person within a certain range, etc.), user activity (gestures, user's heart rate reaches a particular value, user falls asleep, etc.), and so forth.

At step 504, the process identifies a particular VR content element (object of interest) and determines whether it needs to be presented in the passthrough feed (e.g., whether to composite the customized passthrough feed with a VR content element). In an embodiment, such VR content element may be identified based on frames from recently rendered VR content and/or predicted frames of VR content, predicted user activity in the real-world environment, scene information extracted from the recently or expected VR frames predicted to be rendered, and so forth. For example, a set of expected VR frames in a buffer (to be rendered) may indicate that a VR content element may be displayed which, in the context of the virtual events within the VR scene, is a significant feature in the VR environment which requires user attention. In another example, 6 DOF movement, direction, and/or speed data of the user may be used to predict that the user will move in such a way as to encounter an object of interest in the VR environment. The combination of the user movement with the VR scene information may be used to identify the object of interest. In another embodiment, the VR content element may be manually identified (e.g., predetermined or manually marked by the user, based on user interests or user history), may be marked programmatically (e.g., preconfigured by the system, may be pre-tagged for VR content), or be assigned priority for display.

In an embodiment, the system may analyze high-level features from the VR content (e.g., recently rendered VR scenes and/or expected scenes) to identify an object of interest and whether to composite the object of interest with the passthrough feed. For example, an object of interest from VR content which matches the features of the passthrough feed can be extracted from the VR content and placed within the window showing the passthrough feed. Matches such as object match, entity match, and semantic match can be used to select the object of interest. Further, the object of interest from the VR content may be determined to match the features of the passthrough feed if their high-level features (e.g., as extracted by an image recognition system) are within a particular range in Euclidian distance.

In an alternative embodiment, the process may also identify an entity of interest, which may comprise an object in the real-world environment to which the user should direct their attention. The identity and position of the entity of interest may be determined based on frames received from a real-world camera and/or user activity data, such as the user's 6 DOF movement, direction, and speed data in relation to the real-world environment. For example, the entity of interest may comprise a real-world object that, based on the user's movements, the user is likely to encounter or interact with (e.g., collide with, face, block, etc.). The entity of interest may be a real-world object for which passthrough is being enabled. For example, the presence of the entity of interest or the entity of interest being within a certain range to the user may be an event which triggers activation of the passthrough feed.

In an embodiment, the position of the identified object of interest (or region of interest) as rendered on the VR display may be predicted based on user activity data and/or scene information of the recently rendered VR content or of expected VR content that has been simulated or queued for rendering. 6 DOF movement, direction, and speed data of the user with respect to the VR environment and/or real-world environment may also be used to predict the position of the object of interest. The system may also consider scene information of each reality (e.g., what and where the types of objects are located in each reality) and where in each reality environment the user may move. If display of the passthrough window is determined to cover the VR object of interest, the system may extract the object of interest (e.g., from the VR frame) and place it overlaying the real-world feed.

According to an embodiment, the determination to present (e.g., whether to present and/or when to present) the identified VR content element (object of interest) in the passthrough feed may be based on expected frames of VR content (e.g., predicted or queued to be rendered), predicted user interaction in the predicted VR environment, and/or predicted user movement in the real-world environment. The system may predict a field of view of VR content based on recently rendered frames of a field of view of VR content and/or user activity data. The predicted frames of VR content may comprise predicted data on features of the VR environment in the upcoming frames and how the user will interact within the predicted VR environment. Predicted user movement in the real-world may be based on user activity data. In another embodiment, the system may determine to present the identified VR content element based on the VR content element being assigned a priority to display. For example, various VR content elements may be identified and assigned a rank in priority to be displayed. A VR content element with a higher rank may be given more weight in the determination of whether it should be presented in the passthrough feed In an embodiment, presentation of the VR content element in the passthrough feed may be determined as an appropriate technique for customizing the passthrough feed based on the expected VR frames and user movement. In another embodiment, the compositing of the customized passthrough feed (e.g., by way of placing the determined object of interest from the VR environment in the passthrough feed) may also be determined to be an appropriate technique for customizing the passthrough feed based on parameters, such as the duration of time for which the passthrough will remain enabled, the color intensity difference between the VR content and passthrough feed, the event or purpose for which the passthrough feed is enabled, and/or the relative size of the passthrough feed display window in the VR environment. Other parameters may also be used to determine whether the customized passthrough feed should be composited with the VR content element, such as parameters which impact whether the customized passthrough would improve user experience during activation of passthrough feed and VR content or simultaneous display of the two realities, or whether the object of interest is assigned priority or otherwise configured to be presented in the passthrough feed. Various combinations of such parameters may be used, and various weights may be given to each parameter in the determination to composite the customized passthrough feed.

At step 506, the process determines the presentation of the VR content element in the passthrough feed based on the aforementioned parameters. In an embodiment, selection (e.g., identification) of the VR content element and determination of whether the VR content element needs to be placed within the passthrough feed window may be based on the passthrough time duration. For example, if the passthrough time duration exceeds a particular length of time and/or the VR content element is tagged with high priority, the system may present the VR content element within the passthrough feed window.

In another embodiment, identification, determination to present, and/or placement of the VR content element in the passthrough feed may be based on the color intensity difference between the VR content and the passthrough feed. When passthrough functionality is enabled, frames from the recently rendered VR and/or the expected VR content (predicted or queued to be rendered) may be compared with the passthrough feed to analyze the intensity difference between the images. In the situation where the user attention should be directed to the VR content element and the level of intensity differences is high, the system may be more likely to composite the VR content element in the passthrough feed. In the situation where user attention to the VR content element is insignificant and the intensity differences between the realities are relatively low (e.g., wherein presentation of the VR content element in the passthrough feed may likely go unnoticed), the system may determine that presentation of the VR content element is unnecessary.

In yet another embodiment, the identification, determination to present, and/or placement of the VR content element in the passthrough feed may be based on an event triggering the passthrough feed or the purpose for activating the passthrough feed. For example, if passthrough is enabled due to an event (whether within the VR experience or in the real-world) which requires a specific object to be shown (for instance, a keyboard for receiving necessary user input or a physical hazard from the real-world feed), the system may ensure that view of the real-world object is not obscured when placing the VR content element over the passthrough feed on the display.

Also in another embodiment, identification, determination to present, and/or placement of the VR content element in the passthrough feed may be based on the relative size of the passthrough feed display window in the VR environment. The size of the passthrough feed window may comprise a portion of the VR screen or field of view, through which the passthrough field is shown. The size and/or position of the passthrough feed may be determined based on the portion of the passthrough feed that needs to be shown. For example, the passthrough feed window may be positioned in a corner of the viewing area of the VR display and its size may occupy a portion (e.g., 10%, 50%, etc.) of the viewing area. If the window size is smaller than a particular size, the system may bypass presentation of the VR content element in the passthrough feed to prevent mixing of reality, reduce likelihood that a user would overlook such a small display window, or prevent obstruction of display of a significant real-world object. In another embodiment, if the window exceeds a particular size, the system may place the VR content element and/or increase the number of VR content elements placed in the passthrough feed. In another example, the VR content element may be placed in the passthrough feed based on the position of the passthrough feed window relative to the viewing area of where the VR content is displayed, such as in the center of the viewing area, a corner, whether placement of the passthrough feed window would otherwise obstruct viewing of a significant feature of VR content, and so forth. In another embodiment, when the relative size of the passthrough feed display window is greater than the VR content window, the system may extract high-level features of an image from the passthrough feed (e.g., extract a passthrough feed element such as an entity of interest) and present the passthrough feed on VR content window (e.g., thereby compositing the VR content with placement of the passthrough feed element to the VR content instead of, or in addition to, compositing the passthrough feed with a VR content element).

At step 508, the most recently rendered N frames of VR content are received. The number of frames may be based on user preferences or preconfigured settings. In other embodiments, the number of frames may be determined based on a trained machine learning model for extracting image features from VR content and/or predicting upcoming frames of VR content. For example, the number of frames may comprise the last 30 seconds of rendered VR content. In another embodiment, expected frames of VR content may be predicted, simulated (or queued to be rendered) and received. For example, M number of frames (such as 30 seconds of content) may be predicted and obtained. At step 510, the process receives passthrough feed captured by a passthrough camera (e.g., an outward facing camera coupled to the VR device).

At step 512, based on the elements (e.g., image properties) extracted from frames of the two realities, the process creates a customized passthrough feed by mixing the extracted elements. When passthrough feed is enabled, the system may composite the passthrough feed rendering for each frame by placing (for example, overlaying, superimposing, etc.) the extracted VR object of interest in the passthrough feed, wherein the placement of the VR object of interest and any real-world entity of interest do not overlap. For instance, the selected and extracted VR content element (e.g., VR object of interest) may be overlaid on top of the passthrough feed. In another instance, if the system determines that the VR object of interest which requires the user's attention is predicted to appear in a region of the VR display, but a portion of the passthrough feed (e.g., which is expected to be activated at the time of rendering the expected VR frames) would otherwise obstruct the VR object of interest (e.g., the portion of the passthrough feed may be in the same position on the VR display as that of the VR object of interest), then the VR object of interest may be extracted from the VR content and overlaid on top of the portion of the passthrough feed. While overlaying is used in the examples, other image blending techniques may be applied for displaying the VR object of interest in the selected region of the passthrough feed, such as compositing, transparency setting, and the like.

Once customized, the passthrough feed is rendered on the VR display at step 514. In some embodiments, the customized passthrough feed may be made more intuitive by adding for display more virtual objects from the VR content and/or other supplemental virtual objects such as bubbles, icons, messages etc. Such supplemental virtual objects may be used based on scene information extracted from the VR content and/or real-world scene. The supplemental virtual objects may be added to the display to indicate to the user about the transition from VR content to passthrough feed, highlight which real-world entity or VR object the user should pay attention to, and so forth.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
rendering, on a virtual reality (VR) device, VR content;
receiving user activity data of a user associated with the VR device;
predicting a next segment of VR content based on the rendered VR content and user activity data;
predicting, based on the user activity data, user movement with respect to a real-world environment;
activating a passthrough feed;
based on the next segment of VR content and the predicted user movement in the real-world environment, customizing the passthrough feed based on incorporating VR content features into the passthrough feed, wherein a degree of the customizing the passthrough feed with the incorporated VR content features corresponds to an estimated duration during which the passthrough feed is activated; and
displaying the customized passthrough feed simultaneously with the VR content on the VR device.

2. The method of claim 1, further comprising:
customizing the passthrough feed based on an event or purpose which triggered activation of the passthrough feed.

3. The method of claim 1, further comprising:
customizing the passthrough feed based on a size of a display window of the passthrough feed relative to a size of a display window of the VR content.

4. The method of claim 1, further comprising:
generating a custom style filter for customizing the passthrough feed, wherein the custom style filter is based on low-level features extracted from at least an image frame of the rendered VR content.

5. The method of claim 4, wherein a degree of blending by the custom style filter of the passthrough feed and the VR content corresponds to a level of color intensity difference between the passthrough feed and the VR content.

6. The method of claim 5, wherein the custom style filter comprises a pixel-manipulation-based filter.

7. The method of claim 1, further comprising:
creating a style transfer neural network for customizing the passthrough feed, wherein the style transfer neural network is based on low-level features extracted from at least an image frame of the rendered VR content.

8. The method of claim 7, wherein a degree of blending by the style transfer neural network of the passthrough feed and the VR content corresponds to a level of color intensity difference between the passthrough feed and the VR content.

9. The method of claim 7, further comprising:
estimating a number of layers of the style transfer neural network, the number of layers based on at least one of: a duration during which the passthrough feed is activated, a level of color intensity difference between the VR content and the passthrough feed, an event or purpose which triggered activation of the passthrough feed, or a size of a display window of the passthrough feed relative to a size of a display window of the VR content.

10. The method of claim 1, wherein customizing the passthrough feed further comprises:
selecting an object of interest from the VR content; and
overlaying the object of interest on a portion of the passthrough feed.

11. The method of claim 1, wherein user activity data may be detected by at least one of an inward facing camera, eye tracker, external camera, inertial measurement unit or a wearable device coupled to the VR device.

12. The method of claim 1, wherein the user activity data may comprise at least one of eye movement, facial expression, bodily movement, or biometric data.

13. A system comprising control circuitry configured to:
render, on a virtual reality (VR) device, VR content;
receive user activity data of a user associated with the VR device;
predict a next segment of VR content based on the rendered VR content and user activity data;
predict, based on the user activity data, user movement with respect to a real-world environment;
activate a passthrough feed;
based on the next segment of VR content and the predicted user movement in the real-world environment, customize the passthrough feed, based on incorporating VR content features into the passthrough feed, wherein a degree of the customizing the passthrough feed with the incorporated VR content features corresponds to an estimated duration during which the passthrough feed is activated; and
display the customized passthrough feed simultaneously with the VR content on the VR device.

14. The system of claim 13, wherein the control circuitry is further configured to:
customize the passthrough feed based on an event or purpose which triggered activation of the passthrough feed.

15. The system of claim 13, wherein the control circuitry is further configured to:
customize the passthrough feed based on a size of a display window of the passthrough feed relative to a size of a display window of the VR content.

16. The system of claim 13, wherein the control circuitry is further configured to:
generate a custom style filter for customizing the passthrough feed, wherein the custom style filter is based on low-level features extracted from at least an image frame of the rendered VR content.

17. The system of claim 16, wherein the custom style filter comprises a pixel-manipulation-based filter.

18. The system of claim 13, wherein the control circuitry is further configured to:
create a style transfer neural network for customizing the passthrough feed, wherein the style transfer neural network is based on low-level features extracted from at least an image frame of the rendered VR content.

* * * * *